(12) United States Patent
Chubbuck et al.

(10) Patent No.: US 7,121,569 B1
(45) Date of Patent: Oct. 17, 2006

(54) SEATSTAY FOR A BICYCLE

(75) Inventors: Kyle L Chubbuck, San Jose, CA (US); Jason L. Chamberlain, Morgan Hill, CA (US)

(73) Assignee: Specialized Bicycle Components, Inc., Morgan Hill, CA (US)

( * ) Notice: Subject to any disclaimer, the term of this patent is extended or adjusted under 35 U.S.C. 154(b) by 0 days.

(21) Appl. No.: 11/089,772

(22) Filed: Mar. 25, 2005

(51) Int. Cl.
*B62K 19/06* (2006.01)

(52) U.S. Cl. .................................. 280/281.1

(58) Field of Classification Search ............ 280/281.1, 280/288
See application file for complete search history.

(56) References Cited

U.S. PATENT DOCUMENTS

| | | | |
|---|---|---|---|
| 447,835 A | 3/1891 | Leechman | |
| 595,148 A | 12/1897 | Cobb | |
| 680,493 A | 8/1901 | Meunier | |
| 1,262,786 A * | 4/1918 | Harley | 280/288 |
| 1,329,285 A | 1/1920 | Brownlee | |
| 2,479,578 A | 8/1949 | Langvand | |
| 2,491,379 A | 12/1949 | Kraeft et al. | |
| D158,197 S | 4/1950 | Kimberley | |
| 2,550,941 A | 5/1951 | Schuricht | |
| 2,567,165 A | 9/1951 | Buskirk | |
| 3,005,369 A | 10/1961 | Koster | |
| 3,074,302 A | 1/1963 | Coulon et al. | |
| 4,513,985 A | 4/1985 | Graham | |
| D295,844 S | 5/1988 | Levine | |
| 5,116,071 A * | 5/1992 | Calfee | 280/281.1 |
| 5,452,911 A * | 9/1995 | Klein et al. | 280/288 |
| 5,676,780 A | 10/1997 | Chen et al. | |
| D403,992 S | 1/1999 | D'Alusio et al. | |
| 6,267,399 B1 * | 7/2001 | Buckmiller et al. | 280/281.1 |
| 6,497,427 B1 | 12/2002 | D'Alusio et al. | |
| 6,835,362 B1 | 12/2004 | Eriksson | |
| 2002/0030345 A1* | 3/2002 | Colnago | 280/288 |

* cited by examiner

*Primary Examiner*—Kevin Hurley
(74) *Attorney, Agent, or Firm*—Michael Best & Friedrich LLP

(57) ABSTRACT

A bicycle frame adapted to support a rear wheel that defines a central plane. The frame includes a first seat stay tube that defines a side surface and has a first portion disposed on a first side of the rear wheel and a second portion having a centerline disposed substantially on the central plane. A second seat stay tube has a third portion disposed on a second side of the rear wheel opposite the first side and a first end attached to the side surface of the first seat stay tube.

16 Claims, 4 Drawing Sheets

SEATSTAY FOR A BICYCLE

BACKGROUND

The present invention relates to a bicycle seatstay.

Bicycles generally include a frame that engages and supports a front wheel, a rear wheel, and a seat. The frame typically includes a seat tube that extends upward to support the seat and a seatstay that extends rearward and downward from the seat tube to at least partially support the rear wheel.

Many different seatstay arrangements are known. One prior seatstay includes two tubes that attach to the seat tube on either side. The two seatstay tubes do not directly connect to one another. Another prior seatstay includes a Y-shaped member that attaches to the seat tube and two side tubes that each attach to one side of the Y-shaped member.

The two examples described, as well as other seatstays, require several different components to complete the seatstay. As such, the assembly of the components requires significant labor, tooling, and skill, and as such can be costly and inefficient.

SUMMARY

The present invention provides an efficient bicycle seatstay. The seatstay includes a first tube that has a first end that attaches to a seat tube and a second end that extends along one side of a rear wheel. Another tube that is substantially the same as the first tube is trimmed to remove a portion of the tube. The trimmed end attaches to the side wall of the first tube such that the tube extends along the opposite side of the rear wheel as the first tube.

The invention also provides a method of manufacturing a bicycle seatstay. The method includes manufacturing two tubes that are substantially the same as one another. A first end of the first tube attaches to the seat tube. The second tube is inverted relative to the first tube and trimmed to define a first end. The first end of the second tube is attached to the surface of the first tube to complete the seatstay.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
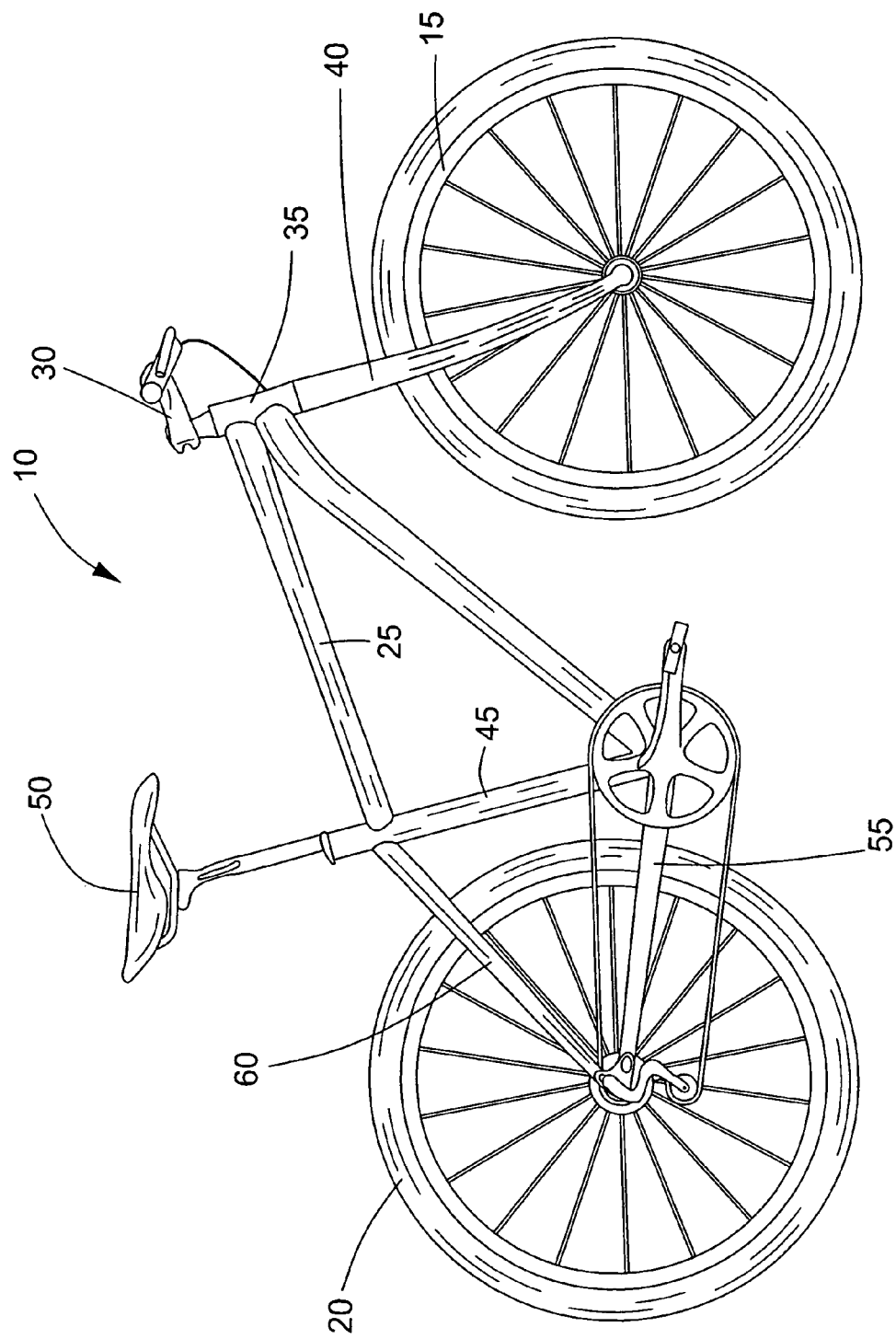
FIG. 1 is a side view of a bicycle including a frame embodying the present invention.

FIG. 1 illustrates a bicycle 10 that includes a front wheel 15, a rear wheel 20, a frame 25, and a handlebar 30. The frame 25 includes a head tube 35 that receives and supports a front fork 40. The handlebar 30 attaches to the front fork 40 and allows the rider to steer the bicycle 10. A seat tube 45 provides an attachment point for a seat 50. The seat 50 attaches to the seat tube 45 and is generally adjustable to allow the rider to choose a comfortable riding position. A chain stay 55 connects to the bottom of the seat tube 45 and extends rearward on either side of the rear wheel 20. A seatstay 60 attaches to the top portion of the seat tube 45 and extends downward and rearward on either side of the rear wheel 20. The seatstay 60 and the chain stay 55 cooperate with one another to support the rear wheel 20 such that it is able to rotate about an axle and propel the bicycle 10.

Figure 2:
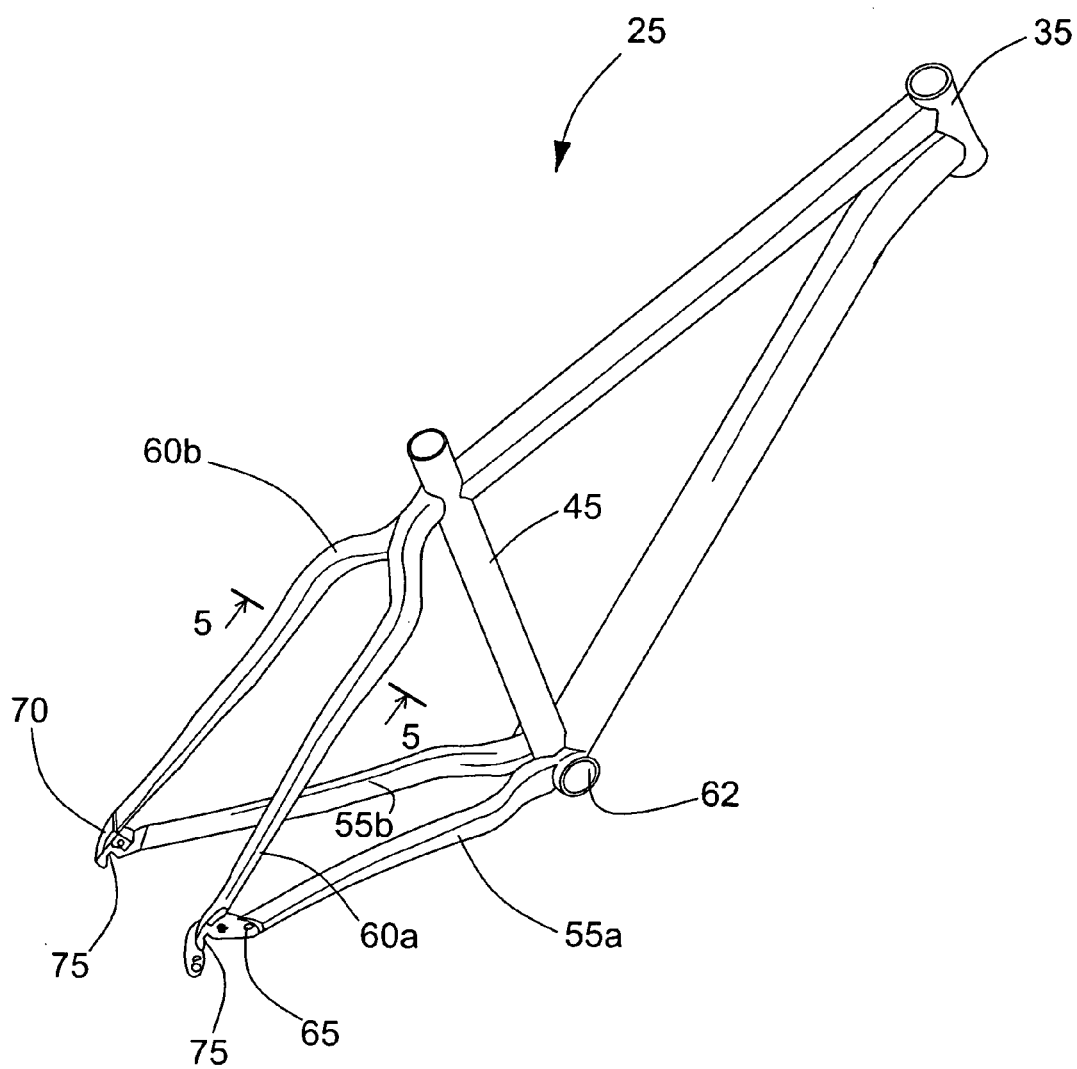
FIG. 2 is a perspective view of the frame of FIG. 1 including a seatstay.

Turning to FIG. 2, the frame 25 is shown alone to more clearly illustrate the various components. The chain stay 55 includes a right tube 55a that attaches to a bottom bracket 62 and extends rearward along the right side of the rear wheel 20. The chain stay 55 also includes a left tube 55b that attaches to the bottom bracket 62 and extends rearward along the left side of the rear wheel 20. In the illustrated construction, the left tube 55b of the chain stay 55 is a substantial mirror image of the right tube 55a. Of course, other constructions may include other chain stay designs or may include other attachment means between the chain stay tubes 55a, 55b and the seat tube 45.

The seatstay 60 includes a right tube 60a that extends along the right side of the rear wheel 20 and a left tube 60b that extends along the left side of the rear wheel 20. A first rear dropout 65 couples the right tube 55a of the chain stay 55 with the right tube 60a of the seatstay 60. Similarly, a second rear dropout 70 couples the left tube 55b of the chain stay 55 with the left tube 60b of the seatstay 60. The first rear dropout 65 and the second rear dropout 70 include apertures 75 that are adapted to receive and support an axle of the rear wheel 20. In addition, the rear dropouts 65, 70 may include attachment points that allow for the attachment of other components (e.g., derailleur, rack, and the like).

Figure 3:
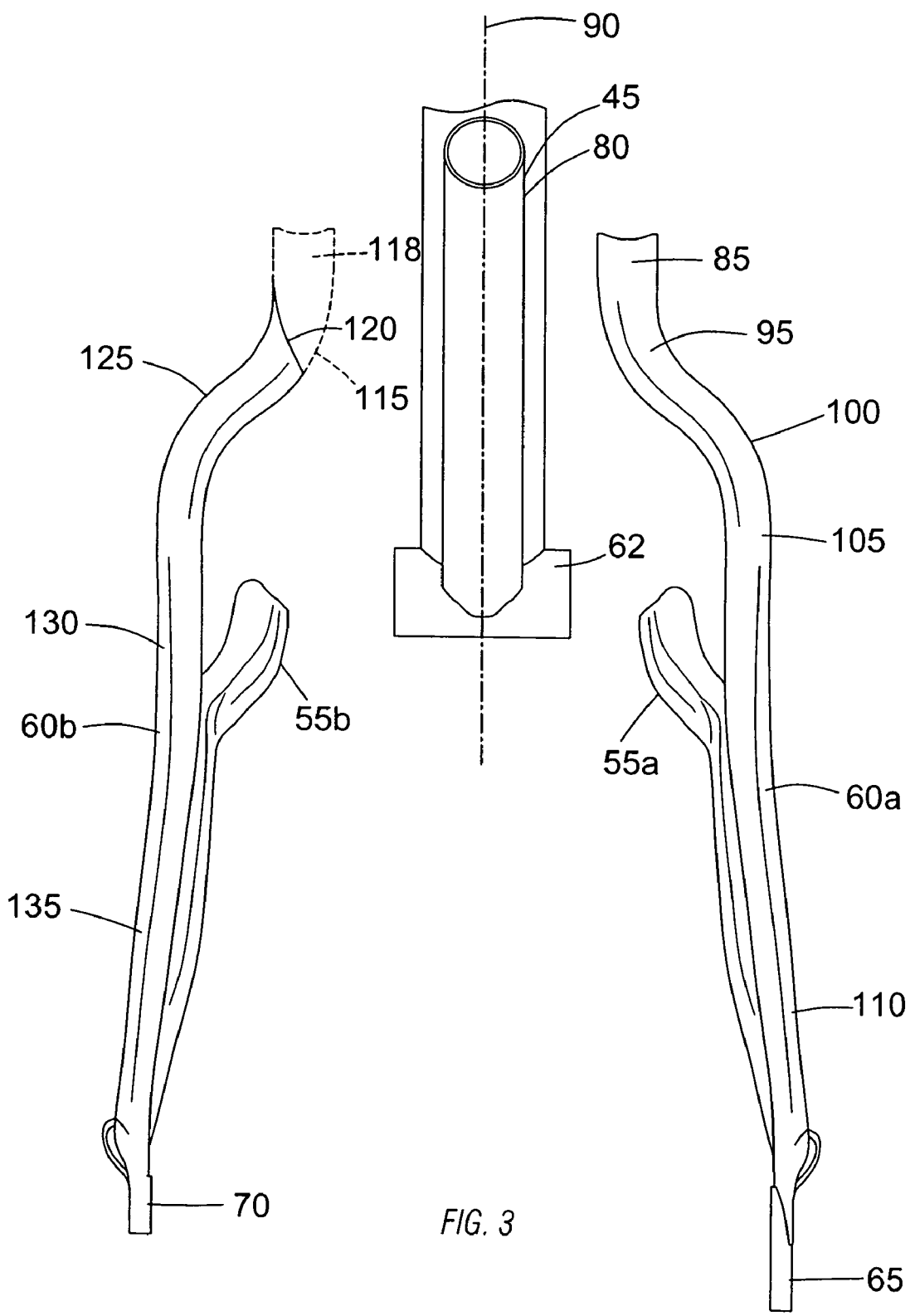
FIG. 3 is an exploded rear view of the seatstay of FIG. 2.

As illustrated in FIG. 3, the right tube 60a of the seatstay 60 includes a first end 80 that attaches to the seat tube 45. In preferred constructions, the first end 80 is contoured to closely mate with the seat tube 45 and is welded to the seat tube 45. Of course, other attachment means (e.g., fasteners, adhesive, soldering, brazing, and the like) could be employed if desired. The right tube 60a includes a first substantially straight portion 85 that extends rearward from the seat tube 45 such that the center of the first substantially straight portion 85 is disposed substantially along a central plane 90 defined by the rear wheel 20 and the seat tube 45. A first bend 95 directs the tube 60a toward the right side of the rear wheel 20 such that the tube 60a extends away from the centerline of the rear wheel 20. A second bend 100 is in the opposite direction as the first bend 95 and leads to a second substantially straight portion 105 that is offset from the first substantially straight portion 85. A third substantially straight portion 110 extends from the end of the second substantially straight portion 105 and is angled relative to the second substantially straight portion 105 to provide additional clearance for the center portion of the rear wheel 20 and associated gears.

The left tube 60*b* of the seatstay 60 is substantially the same as a portion of the right tube 60*a* of the seatstay 60. In preferred constructions, the left tube 60*b* is substantially the same as at least 75 percent of the right tube 60*a*. In these preferred constructions, the left tube 60*b* does not include a portion that is analogous to the first substantially straight portion 85. Rather, the left tube 60*b* is trimmed at a first bend 115 to remove a trimmed portion 118 (shown in broken lines in FIG. 3) and define a first end 120. The trimmed portion 118 is shaped and positioned in a way that allows the first end 120 to abut the side wall of the right tube 60*a* and extend around the left side of the rear wheel 20. Once positioned, the left tube 60*b* is a substantial mirror image of the portion of the right tube 60*a* with the mirror plane being the central plane 90 of the bicycle 10. Thus, the left tube 60*b* does not directly connect to the seat tube 45, but rather connects to the right tube 60*a*. The left tube 60*b* includes at least a portion of the first bend 115, a second bend 125, a second substantially straight portion 130, and a third substantially straight portion 135 that are substantially the same as these features of the right tube 60*a*.

While the left tube 60*b* has been described as being trimmed relative to the right tube 60*a*, other constructions may trim the right tube 60*a* relative to the left tube 60*b*. As such, the invention should not be limited to arrangements that require the right tube 60*a* to be longer than the left tube 60*b*. In addition, the invention should not be limited to tubes 60*a*, 60*b* that include portions that are substantial mirror images of one another, as some applications may require differences between the right tube and the left tube.

Figure 4:
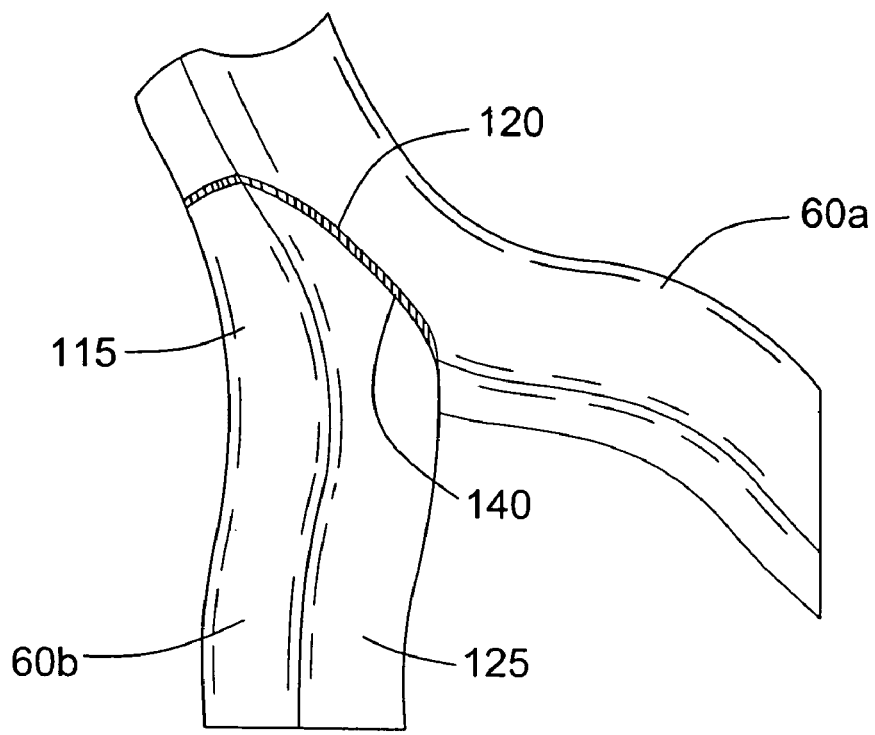
FIG. 4 is an enlarged perspective view of a portion of the seatstay of FIG. 2.

In preferred constructions, the left tube 60*b* is welded to the right tube 60*a*. FIG. 4 illustrates a seam 140 that is defined when the left tube 60*b* is welded to the right tube 60*a*. As can be seen, the seam 140 is such that it terminates on or near the central plane 90. Thus, very little of, or none of the left tube 60*b* extends across the central plane 90. Preferably, the entire left tube 60*b* is positioned on the left side of the bicycle 10, while a portion of the right tube 60*a* extends across the central plane 90.

Figure 5:
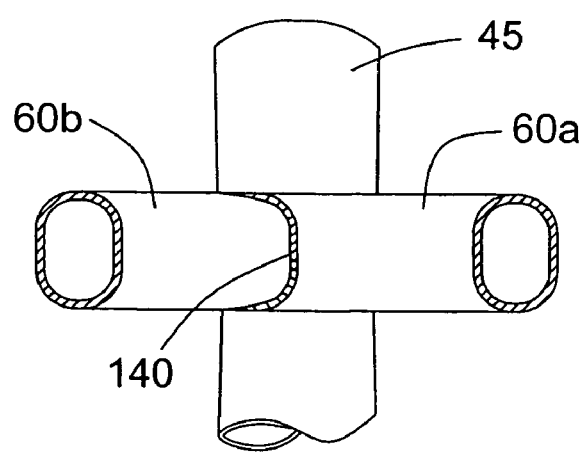
FIG. 5 is section view of the seatstay of FIG. 1 taken along line 5—5 of FIG. 2.

As illustrated in FIG. 5, the right tube 60*a* and the left tube 60*b* of the seatstay 60 are substantially oval in cross section. Alternatively, square tube with large corner fillets can be employed. In still other constructions, circular tubes, polygonal tubes, elliptical tubes, or solid members can be employed. As one of ordinary skill will realize, the cross section of the tubes 60*a*, 60*b* can vary greatly and still be suited for use with the invention just described. Thus, the invention should not be limited to the oval tube described and illustrated.

With reference to FIGS. 3 and 4, the assembly of the seatstay 60 will be described. In preferred constructions, two substantially identical tubes are manufactured using the same manufacturing process. For example, the tube can be bent using extruded and swaged tubing, or the tube can be formed in a mold or other device. It is preferred that the tubes 60*a*, 60*b* be formed from a single continuous member. However, some constructions may employ tubes fabricated from multiple pieces. The first tube is fixed in a position that matches the position of the right tube 60*a*. A clamp, jig, or assembly fixture can be employed to hold the right tube 60*a* in place. Alternatively, the right tube 60*a* can be welded to the seat tube 45 to fix it in the desired position. The left tube is flipped relative to the right tube 60*a* such that it is the mirror image of the right tube 60*a*. The trimmed portion 118 (shown in broken lines in FIG. 3) of the left tube is removed using any common cutting process to define the first end 120. After removing the unwanted portion 118 of the left tube, the first end 120 is shaped such that it closely mates with the side surface of the right tube 60*a*. The left tube 60*b* is then attached (e.g., welded) to the right tube 60*a* to complete the seatstay 60.

The assembly technique just described allows for the production of a single tube design that can be used as either the right tube 60*a* or the left tube 60*b* of a seatstay 60. The use of only a single part makes it easier to store and track the parts and allows for higher-volume production than what would be achievable if the seat stay 60 required different tube designs for the right tube 60*a* and the left tube 60*b*.

While the present invention has been described as it applies to a seatstay 60, one of ordinary skill in the art will realize that other portions of the bicycle 10 or the frame 25 could be manufactured using similar components and processes. For example, the chain stay 55 could be manufactured in much the same way as the seatstay 60.

Thus, the invention provides, among other things, a new and useful seatstay 60 for a bicycle 10. More particularly, the invention provides a new and useful seatstay 60 that includes a left tube 60*b* that is substantially the same as a portion of the right tube 60*a*. Various features and advantages of the invention are set forth in the following claims.

What is claimed is:

1. A frame for a bicycle, the frame adapted to support a rear wheel that defines a central plane, the frame comprising:
   a first seat stay tube defining a side surface and having a first portion disposed on a first side of the rear wheel and a second portion having a centerline disposed substantially on the central plane; and
   a second seat stay tube having a third portion disposed on a second side of the rear wheel opposite the first side and a first end attached to the side surface of the first seat stay tube.

2. The frame of claim 1, wherein the first seat stay tube and the second seat stay tube cooperate to define a seam, and wherein the seam extends to the central plane.

3. The frame of claim 1, wherein the first seat stay tube is a single continuous member.

4. The frame of claim 3, wherein the second seat stay tube is a single continuous member.

5. The frame of claim 1, further comprising:
   a seat tube having a centerline disposed substantially on the central plane; and
   a rear dropout adapted to support a rear wheel, wherein the first seat stay tube includes a first end connected to the seat tube and a second end connected to the rear dropout.

6. The frame of claim 1, wherein the second seat stay tube is substantially the same as a part of the first seat stay tube.

7. The frame of claim 6, wherein the part of the first seat stay tube accounts for at least 75 percent of the length of the first seat stay tube.

8. A frame for a bicycle having a rear wheel, the frame comprising:
   a seat tube;
   a first dropout adapted to support the rear wheel;
   a second dropout adapted to support the rear wheel;
   a first seat stay tube including a first portion, a second portion, a first end connected to the first dropout, a second end connected to the seat tube, and a continuous wall extending between the first end and the second end; and
   a second seat stay tube including a first portion, a first end connected to the second dropout, a second end connected to the wall of the first seat stay tube and not to the seat tube, and a continuous wall extending between the first end and the second end.

9. The frame of claim 8, wherein the rear wheel defines a central plane, and the second seat stay tube and the first seat stay tube cooperate to define a seam that extends to the central plane.

10. The frame of claim 8, wherein the first seat stay tube is formed from a single continuous member.

11. The frame of claim 10, wherein the second seat stay tube is formed from a single continuous member.

12. The frame of claim 8, wherein the second seat stay tube is substantially the same as a part of the first seat stay tube.

13. The frame of claim 9, wherein the part of the first seat stay tube accounts for at least 75 percent of the length of the first seat stay tube.

14. A method of forming a frame for a bicycle, the method comprising:

positioning a seat tube;

forming a first seat stay tube having a first end;

forming a second seat stay tube that is substantially the same as the first seat stay tube;

attaching the first end of the first seat stay tube to the seat tube;

removing a portion of the second seat stay tube to define a second end, and resulting in a modified second seat stay tube that is shorter than the first seat stay tube; and attaching the second end of the modified second seat stay tube to the first seat stay tube.

15. The method of claim 14, wherein the first seat stay tube is formed from a single continuous member.

16. The method of claim 15, wherein the second seat stay tube is formed from a single continuous member.

* * * * *